United States Patent
Braat et al.

(10) Patent No.: US 6,781,740 B1
(45) Date of Patent: Aug. 24, 2004

(54) ACHROMATIC PHASE SHIFT DEVICE AND INTERFEROMETER USING ACHROMATIC PHASE SHIFT DEVICE

(75) Inventors: Josephus Johannes Maria Braat, Delft (NL); Hendrik Bokhove, Gouda (NL)

(73) Assignee: Nederlandse Organisatie voor Toegepast-Natuurwetenschappelijk Onderzoek (TNO), Delft (NL)

( * ) Notice: Subject to any disclaimer, the term of this patent is extended or adjusted under 35 U.S.C. 154(b) by 0 days.

(21) Appl. No.: 10/070,613

(22) PCT Filed: Sep. 8, 1999

(86) PCT No.: PCT/NL99/00558

§ 371 (c)(1),
(2), (4) Date: Jun. 12, 2002

(87) PCT Pub. No.: WO01/18586

PCT Pub. Date: Mar. 15, 2001

(51) Int. Cl.[7] .......................... G02F 1/01; G02B 13/10; G02B 7/18; G02B 5/04; B41J 2/47
(52) U.S. Cl. ...................... 359/279; 359/462; 359/669; 359/831; 359/832; 359/837; 359/586; 347/239
(58) Field of Search ................................ 359/279, 462, 359/641, 665, 669, 737, 831, 832, 837, 615, 586; 347/239, 241

(56) References Cited

U.S. PATENT DOCUMENTS 4,673,953 A * 6/1987 Hecht .......................... 347/239

| 4,850,686 A | | 7/1989 | Morimoto et al. .......... 359/196 |
| 5,486,948 A | * | 1/1996 | Imai et al. ................... 359/837 |
| 5,579,177 A | * | 11/1996 | Stumpf ........................ 359/615 |
| 5,636,069 A | * | 6/1997 | Nightingale et al. ......... 359/831 |
| 5,701,203 A | | 12/1997 | Watanabe .................... 359/669 |
| 5,862,001 A | | 1/1999 | Sigler .......................... 359/832 |

FOREIGN PATENT DOCUMENTS

FR 2 734 919 12/1996

* cited by examiner

*Primary Examiner*—Loha Ben
(74) *Attorney, Agent, or Firm*—Young & Thompson

(57) ABSTRACT

The present invention relates to an achromatic phase shift device (1) for introducing a wavelength independent optical phase shift in a first optical beam (40) during operation, comprising at least one dispersive element ($55_k$) formed by first refractive means ($2_k$) and second refractive means ($4_k$), the first refractive means ($2_k$) having a first refractive means input plane (6) for receiving the first optical beam (40) and a first refractive means output plane (8) being at a predetermined angle ($\beta$) to each other, the second refractive means ($4_k$) having a second refractive means input plane (10) and a second refractive means output plane (12) being positioned parallel to the first refractive means input plane (6). The device may comprise further pairs ($55_k$) of respective first and second refractive means ($2_k$, $4_k$). The present invention also relates to an interferometer comprising at least one achromatic phase shift device.

14 Claims, 5 Drawing Sheets

Figure 1:
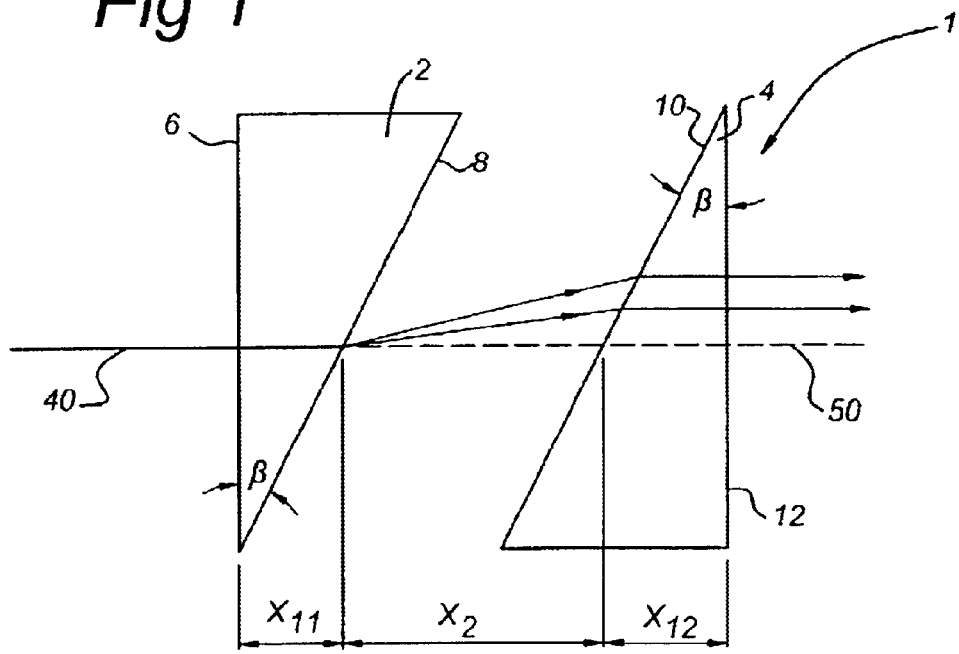

Fig 3
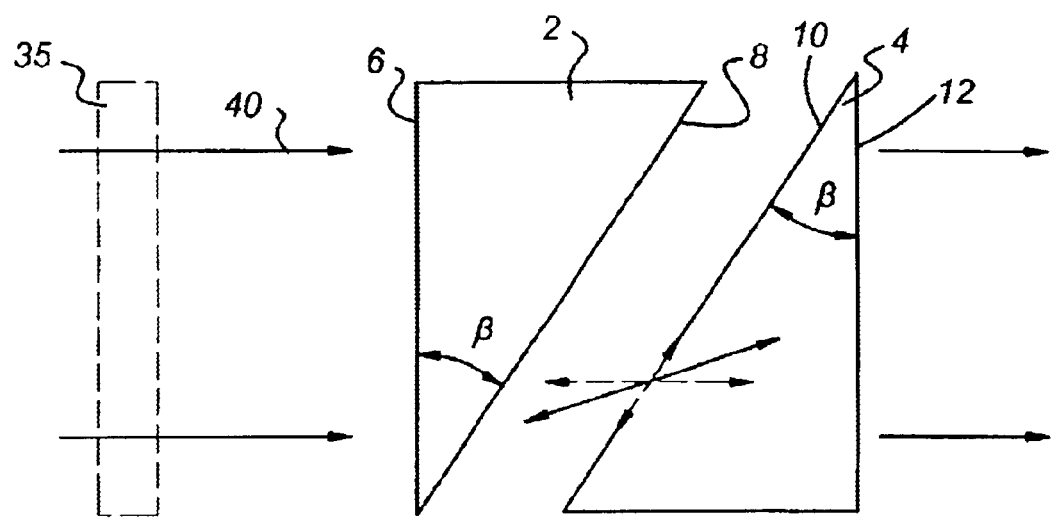
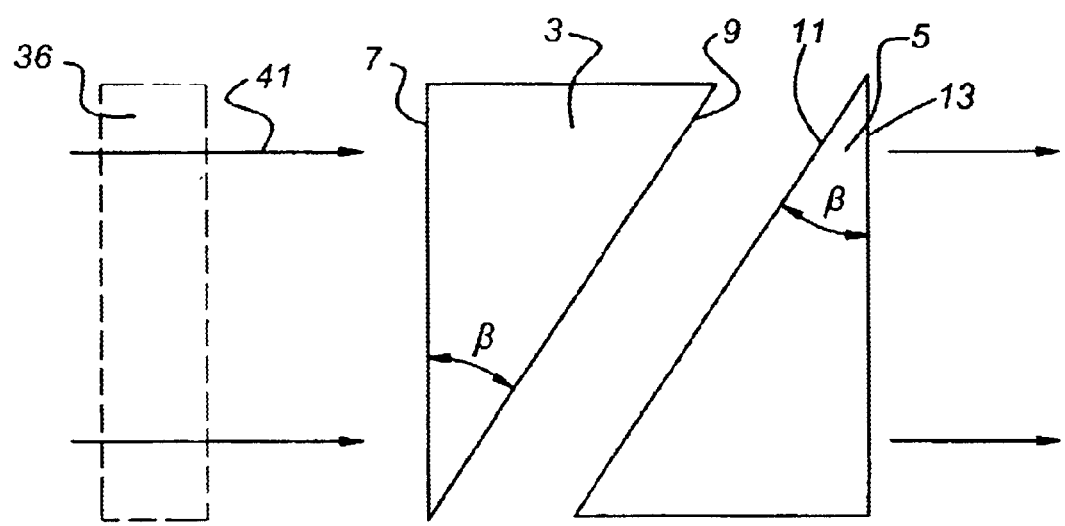

ACHROMATIC PHASE SHIFT DEVICE AND INTERFEROMETER USING ACHROMATIC PHASE SHIFT DEVICE

The present invention relates to an achromatic phase shift device for introducing a wavelength independent optical phase shift in a first optical beam during operation, comprising at least one dispersive element. A second aspect of the present invention relates to an interferometer using such an achromatic phase shift device.

The American patent U.S. Pat. No. 5,862,001 describes a non-deviating prism with a continuously variable dispersion. This arrangement of optical elements allows to obtain a variable angular dispersion without any angular deviation at a central wavelength.

The most common means for obtaining a phase shift in an optical beam are phase shift devices using optical path delay means to influence the optical path of the beam and, thus, the phase of the optical beam. A disadvantage of such a known phase shift device is that the phase shift obtained is dependent on the wavelength. For applications in which the bandwidth of the light beam used is very small, this is not necessarily a problem. However, when a phase shift is needed in an optical beam with a broader bandwidth, the known device does not suffice.

This may for instance be the case for the application of an achromatic phase shift device in an interferometer, used in observation of planets near stars. These interferometers are for instance used in optical synthetic aperture systems, using multiple optical beams from different telescopes separated by a certain baseline. The optical beams from the telescopes usually have a broad wavelength. To be able to detect planets near stars, the light of the star is nulled in the interferometer by introducing a phase difference of $\pi$ radians between the interfering beams. Using known phase shift devices, a suppression factor of 100 may be obtained, while for certain detections a suppression factor of $10^6$ is necessary.

In the prior art, achromatic phase shift in an optical beam is accomplished using an achromatic phase shift device, which comprises dispersive elements being formed by at least two plan parallel plates with a different refractive index. The dispersive elements effectuate a wavelength dependent optical path difference, and with the right combination of materials (refractive index) and dimensions of the plates, an achromatic phase shift can be accomplished over a certain wavelength range. However, the dimensions of the plates are fixed and, therefore, the phase shift accomplished is fixed. Also, at least two materials are needed with a different refractive index, which may be disadvantageous in numerous applications.

It is an object of the present invention to provide a phase shift device for producing a phase shift over a wide frequency range, i.e. an achromatic phase shift device. It is a secondary object of the present invention to provide an interferometer, which is particularly suited for planet detection near distant stars, by nulling the light from the associated star.

The first object is achieved by a phase shift device as disclosed herein.

The arrangement of the device allows introducing a phase shift in an optical beam travelling through the device, by varying the position of the first refractive means relative to the second refractive means. The first and second refractive means may be placed at a certain distance to one another and have small dimensions, which are sufficient for refracting the optical beam in the device as desired.

Using multiple pairs of respective first and second refractive means, it becomes possible to obtain a phase shift of an optical beam through the achromatic phase shift device, which is wavelength independent over a broad wavelength region.

In this embodiment, a perfect match of the predetermined phase shift is obtained for M+1 wavelengths.

In an embodiment of the achromatic phase shift device according to the present invention, the respective first refractive means of the multiple pairs are positioned adjacent to each other, forming a first group, the respective first refractive means in the first group being in physical contact. Preferably, also the respective second refractive means of the multiple pairs are positioned adjacent to each other, forming a second group, the respective second refractive means in the second group being in physical contact. By positioning the respective first and second refractive means such that they are in physical contact, interfaces occur between materials of different refractive index. The feature that the elements are in physical contact enables producing achromatic phase shift devices in a reliable and robust manner.

In a preferred embodiment of the achromatic phase shift device according to the present invention, the respective first and second refractive means of the multiple pairs are positioned symmetrically on respective sides of a first element pair. This allows a very compact arrangement of the device according to the present invention.

In a further embodiment, the refractive index of the first refractive means and the second refractive means of all of a specific pair of element pairs is substantially equal. This has advantages with respect to production of the device (only one dispersive material is needed), but also during operation, as environmental conditions will have less impact when all refractive means are made of the same material.

In certain arrangements of the first and second refractive means of the phase shift device, spaces may exist between the first refractive means and the second refractive means of each of the first pair and the plurality of further pairs. Preferably, these spaces are filled with a predetermined medium having a predetermined refractive index. The medium can be air, a liquid or vacuum. For further calculating purposes, these spaces can also be regarded as forming first and second refractive means.

To be able to use the device as a phase modulator, the device further comprises first control means for moving the first refractive means and the second refractive means of each of the first pair and the plurality of further pairs with respect to each other. Preferably, the direction of movement is perpendicular to a line of intersection of the input surface and output surface of the first refractive means. This allows variation of the distance travelled by the optical beam through the first and second refractive means and between the first and second refractive means of one or more of the first pair and the plurality of further pairs. This may be achieved very accurately by various control means known to the person skilled in the art.

It will be clear to the person skilled in the art that the change in position of the first refractive means relative to the second refractive means may be obtained by moving the first refractive means, the second refractive means, or both.

In an embodiment, the first and second refractive means are preferably formed by a first and a second prism, respectively. Such prisms with the required dimensions can be readily obtained or are easy to manufacture.

In a further embodiment, the device further comprises additional means of a dispersive material for applying a further chromatic correction to the optical beam, in which the dispersive material has a refractive index, which is different from the refractive index of the first and second refractive means. This embodiment enables a further achromatic correction, diminishing the higher order wavelength dependent errors in the chromatic correction.

In an alternative embodiment the sum of the first and second distance of the first and second refractive means and the required optical path are determined by requiring constant terms and terms with $\lambda^2, \lambda^3 \ldots \lambda^M$ to become zero and the term with $\lambda$ to become equal to $\psi_0/2\pi$ in the equation for the introduced optical path length difference $w_d(\lambda)$ according to $$w_d(\lambda) = -w_0 + \sum_{k=0}^{M-1} \{a_{k0} + a_{k1}(\lambda - \lambda_0) + a_{k2}(\lambda - \lambda_0)^2 \ldots \} d_k$$

in which $a_{k0}, a_{k2}, \ldots$ =series expansion coefficients of the modified refractive index $a_k$, according to $a_k = a_{k0} + a_{k1}(\lambda - \lambda_0) + a_{k2}(\lambda - \lambda_0)^2 \ldots$, and in which $\lambda$ is a wavelength of the optical beam and $\lambda_0$ is a central wavelength of a predetermined spectral band.

In this alternative embodiment, an M-th order fit is obtained for the wavelength dependent phase shift around the central wavelength $\lambda_0$.

By changing the design parameters of the first and second refractive means, the phase shift obtained is independent of the wavelength of the optical beam. This allows introducing a constant, wavelength independent phase shift in optical beams having a relatively broad bandwidth.

With the achromatic phase shift device according to the present invention, applications can be made for adjustment, modulation and/or closed loop control of the phase difference of broad band, interfering optical beams.

A second aspect of the present invention relates to an interferometer having a first input plane and a second input plane for receiving at least a first and a second optical beam and an interference plane for letting the at least first and second optical beam interfere, a first optical path being formed from the first input plane to the interference plane and a second optical path being formed from the second input plane to the interference plane, comprising optical path delay means for introducing an optical path difference between the first optical path and the second optical path, characterised in that the interferometer further comprises at least one achromatic phase shift device according to the invention, positioned in at least one of the first optical path and the second optical path.

The interferometer according to the present invention allows introducing a phase shift between optical beams with a broad wavelength range.

Preferably, an achromatic phase shift device is positioned in each optical path. By using an achromatic phase shift device in each optical path, symmetry in the two optical paths is maintained as much as possible, which has particular advantages with respect to maintaining the polarisation state of the optical beams.

For use in planet observations, the interferometer preferably comprises main control means for maintaining the phase shift between the at least first and second beam at a predetermined value, preferably $\pi$ radians, the main control means being connected to the optical path delay means and the first control means. With such an interferometer, it is theoretically possible to obtain a suppression factor of $10^9$.

Figure 2:
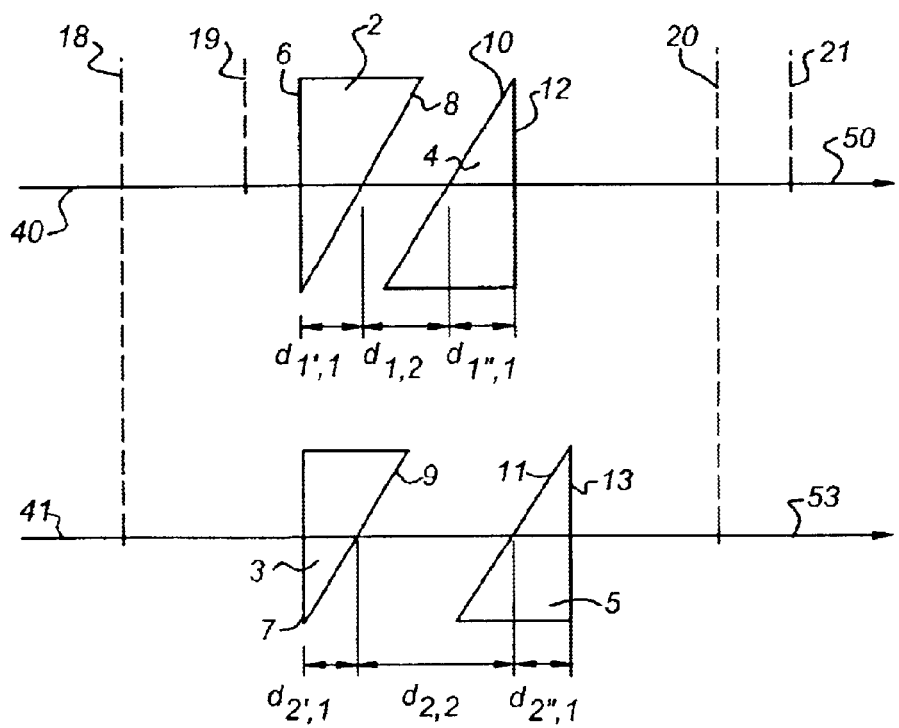
Figure 4:
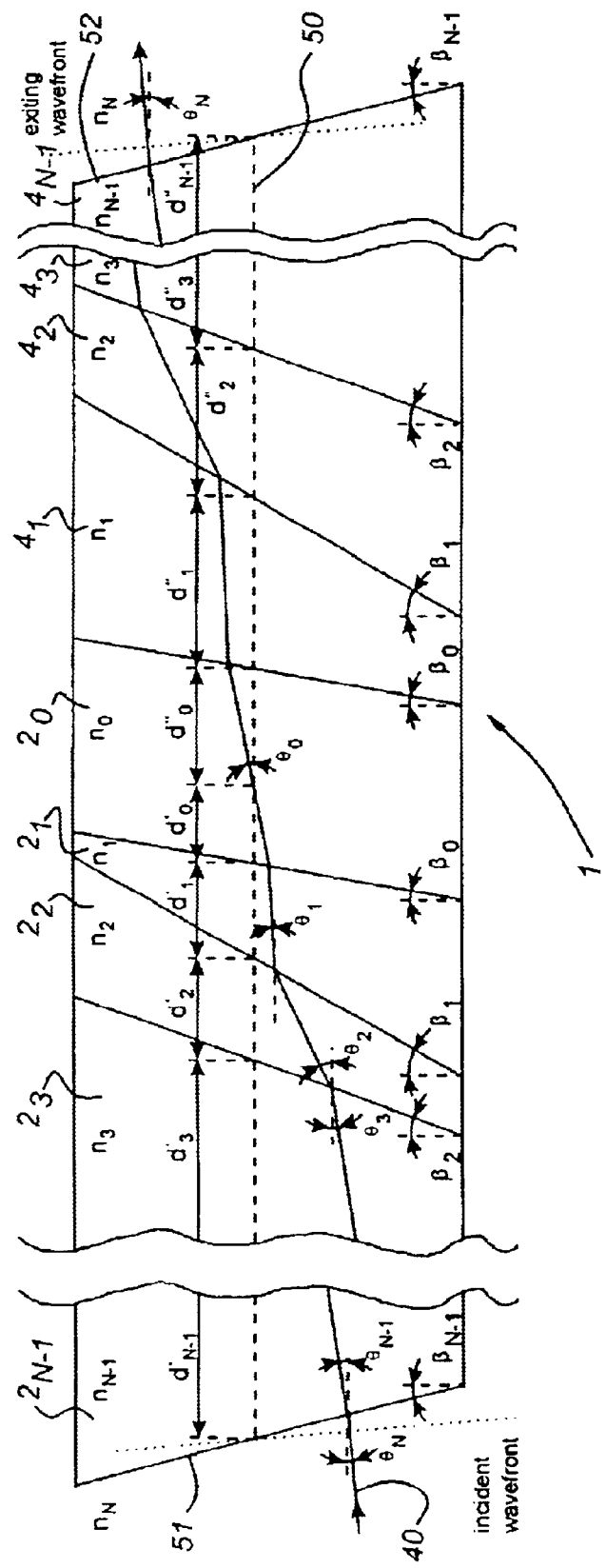
Figure 5:
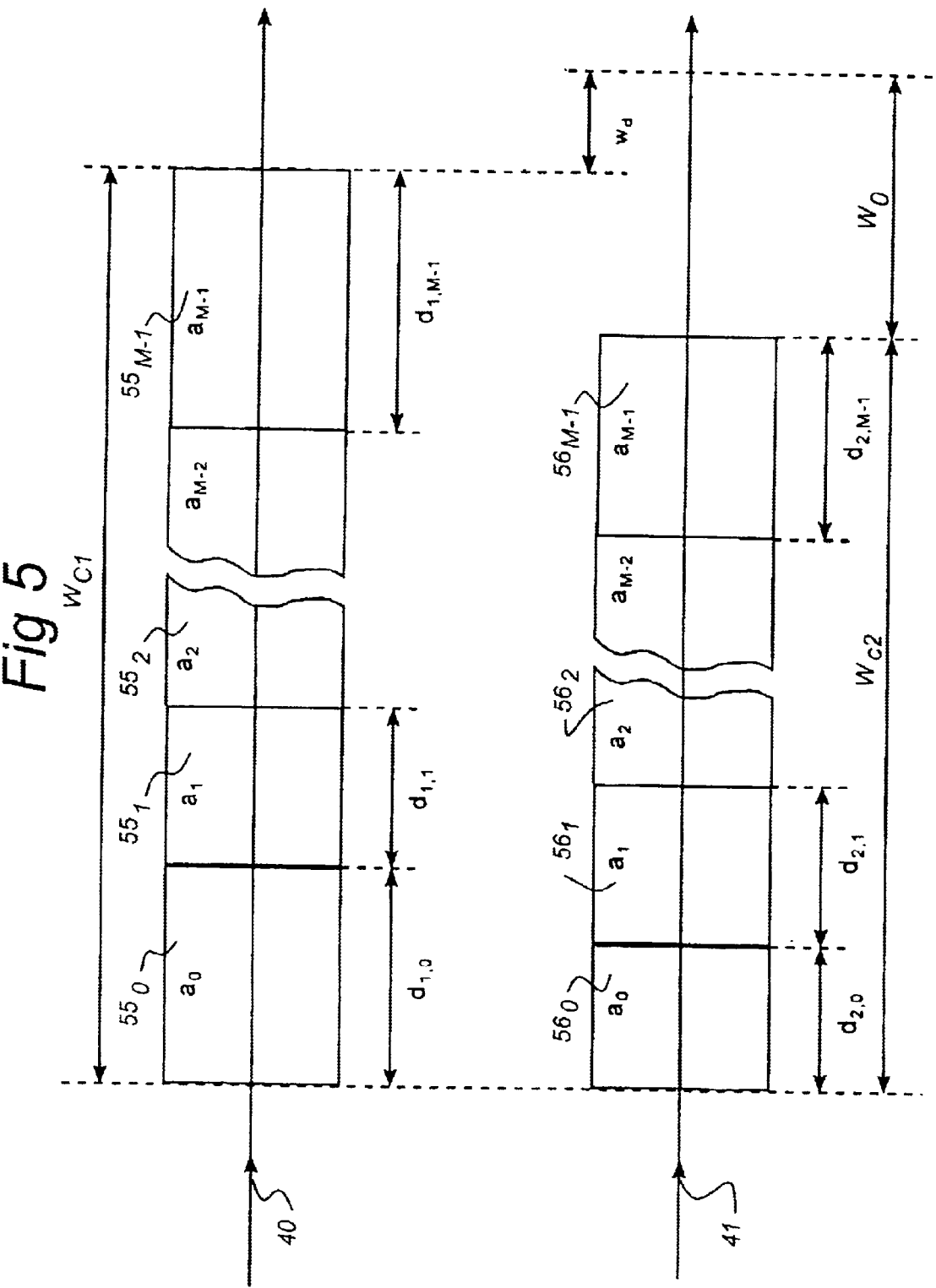
Figure 6:
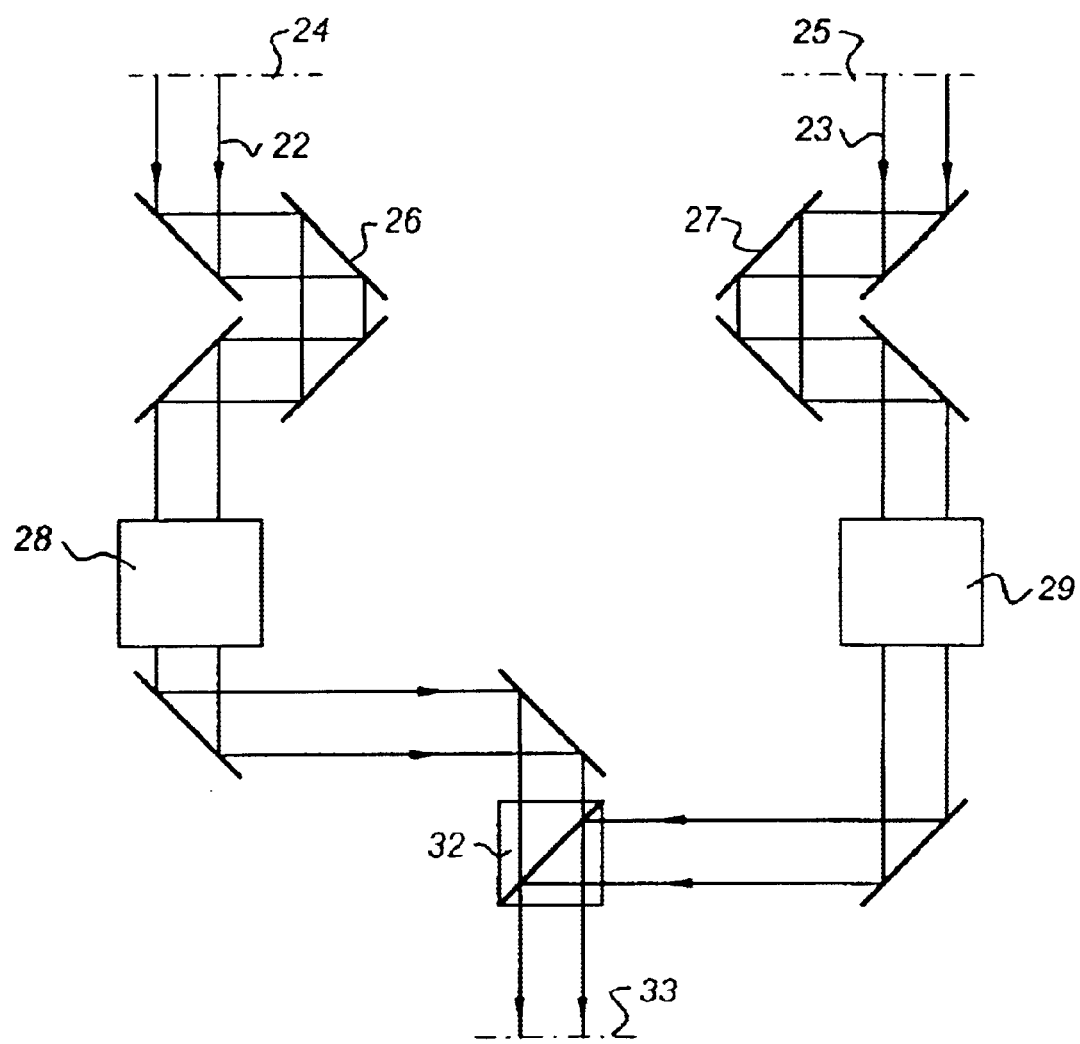

The present invention will be described in detail by means of a number of preferred embodiments, with reference to the accompanying drawings, in which:

FIG. 1 shows a diagrammatic view of an achromatic phase shift device according to an embodiment of the present invention, FIG. 2 shows two achromatic shift devices according to a further embodiment of the present invention, FIG. 3 shows an embodiment of the achromatic phase modulator according to the present invention, FIG. 4 shows a general lay-out of an achromatic phase shift device according to the present invention, FIG. 5 shows a simplified representation of a two beam system with an achromatic phase shift device as shown in FIG. 4, and FIG. 6 shows a diagrammatic view of a two beam interferometer, in which pupil plane interference is applied.

Phase shifting in optical beams with a very small bandwidth (semi-monochromatic light) is equivalent to optical path length variation, easily achievable by delay line type devices. Using these known delay line type devices for optical beams with an extended wavelength interval will lead to different phase shifts at different wavelengths. Hence, a requirement exists for achromatic phase shifting, or wavelength dependent optical path differences.

FIG. 1 shows a diagrammatic view of an achromatic phase shift device 1 according to the present invention, comprising a first prism 2 and a second prism 4 made from a material with a predetermined refractive index n. In operation, an optical beam 40 may be received by a first prism input plane 6. A first prism output plane 8 forms an angle $\beta$ with the first prism input plane 6. At the first prism output plane 8, the optical beam 40 will be refracted from an optical axis 50, indicated as dotted line in FIG. 1 and partly coinciding with the optical beam 40, as will be clear to the person skilled in the art, in which the refraction angle is dependent of the wavelength of the optical beam. The optical beam 40 will then impinge on a second prism input plane 10, where it will be refracted again. If the refractive index n of the first prism 2 is equal to the refractive index of the second prism 4, the refraction angle at the second prism input plane 10 will be equal but of opposite sign to the refraction angle at the first prism output plane 8. In that case, the optical beam 40 will exit the second prism 4 at a second prism output plane 12 in a direction substantially parallel to the direction of the optical beam 40 impinging on the first prism input plane 6.

As shown in FIG. 1, the second prism input plane 10 is positioned equidistant to the first prism output plane 8, and the second prism output plane 12 is positioned parallel to the first prism input plane 6. Because of the wavelength dependent refraction, the optical distance travelled from the first prism input plane 6 to the second prism output plane 12 will therefore be dependent on the wavelength.

The optical path $w_p$ as travelled by the optical beam from the first prism input plane 6 to the second prism output plane 12, is given by $$w_p = n_1(x_{11} + x_{12}) + (\cos \beta \sqrt{1 - n_1^2 \sin^2 \beta} + n_1 \sin^2 \beta) x_2 \qquad (1)$$

in which $n_1$ is the refractive index of the first and second prism 2, 4, $\beta$ equals the angle enclosed by the first prism input plane 6 and first prism output plane 8, $x_{11}$ equals the distance between the first prism input plane 6 and the first prism output plane 8 along the optical axis 42, $x_{12}$ equals the distance between the second prism input plane 10 to the second prism output plane 12 along the optical axis 42, and $x_2$ equals the distance between the first prism output plane 8 and the second prism input plane 10 along the optical axis 50.

Defining $$x_1 = x_{11} + x_{12} \tag{2}$$

and $$n_2 = \cos\beta\sqrt{1-n_1^2\sin^2\beta} + n_1\sin^2\beta \tag{3}$$

being a virtual refractive index $n_2$, the optical path $w_p$ length can be written as $$w_p = n_1 x_1 + n_2 x_2. \tag{4}$$

This is equivalent to an arrangement with two plan parallel plates with different refractive indices positioned in series, and allows introducing a phase shift $\psi_p$ in an optical beam with an optical wavelength $\lambda$ by altering the optical path length $w_p$ according to the equation $$\psi_p = 2\pi w_p/\lambda. \tag{5}$$

However, for a given arrangement of plan parallel plates with fixed dimensions and fixed refractive index, the phase shift $\psi_p$ is also fixed. For achieving a certain phase shift in an optical beam, it would be necessary to be able to vary the distances travelled by the optical beam in the plan parallel plates. However, for practical applications this is not feasible. Also, the requirement for materials with a different refractive index is a disadvantage.

The arrangement shown in FIG. 1 has the advantage that the optical path length $w_p$ can easily be changed by moving the first prism 2 with respect to the second prism 4. Moving the first prism 2 in a direction perpendicular to an intersecting line of the first prism input plane 6 and first prism output plane 8 changes one of the distances $x_{11}$, $x_{12}$ or $x_2$ in equation (4). E.g., a movement of the first and second prism 2, 4 towards each other or away from each other in the direction along the optical axis 42 changes the distance $x_2$ between the first prim output plane 8 and second prism input plane 10. Also, the distance $x_{11}$ or $x_{12}$ can be changed by e.g. moving the first or second prism 2, 4 along the their respective input planes 6, 10 or output planes 8, 12.

By providing control means (not shown) for the movement of the first and second prism 2, 4 with respect to each other, a phase modulator is formed.

Also, the material for the first and second prism 2, 4 can have the same refractive index $n_1$, the virtual refractive index $n_2$ being determined by equation (3). The virtual refractive index $n_2$ is dependent on the refractive index $n_1$ of the first and second prism 2, 4 and on the angle $\beta$.

By proper dimensioning of the achromatic phase shift device 1 and controlling of the movement of the first prism 2 with respect to the second prism 4, the optical path length variation $w_p$ (or phase shift $\psi_p$) can be made largely independent of the wavelength $\lambda$ of the optical beam 40.

For a detailed explanation of the introduced phase shift $\psi_p$, reference is made to FIG. 2, showing a configuration in which in operation a phase shift $\psi_p$ is introduced between a first optical beam 40 along a first optical axis 50 and a second optical beam 41 along a second optical axis 53. For sake of clarity, the optical beams 40 and 41 are shown in FIG. 2 as coinciding with the optical axes 50 and 53. However, from FIG. 1 it is clear that the optical beams 40 and 41 will experience a wavelength dependent shift. Both the first and second optical beams 40, 41 travel through a pair of prisms. A first pair comprises a first prism 2 and a second prism 4 and a second pair comprises a third prism 3 and a fourth prism 4. To introduce a phase shift between the two optical beams only one pair would be sufficient. However, in the configuration shown in FIG. 2, the symmetry between the path travelled by the first and second optical beams along optical axes 50, 53 is maintained as far as possible, which is of particular importance from, e.g. the polarisation point of view.

In FIG. 2, the relevant dimensions of each prism pair are designated as follows: $d_{1,1}'$ equals the distance between the first prism input plane 6 and the first prism output plane 8 along the first optical axis 50, $d_{1,1}''$ equals the distance between the second prism input plane 10 to the second prism output plane 12 along the first optical axis 50, and $d_{1,2}$ equals the distance between the first prism output plane 8 and the second prism input plane 10 along the first optical axis 50. Likewise, $d_{2,1}'$ equals the distance between the third prism input plane 7 and the third prism output plane 9 along the second optical axis 53, $d_{2,1}''$ equals the distance between the fourth prism input plane 11 to the fourth prism output plane 13 along the second optical axis 53, and $d_{2,2}$ equals the distance between the third prism output plane 9 and the fourth prism input plane 11 along the second optical axis 53. All prisms 2, 3, 4, 5 have the same refractive index $n_1$ and the same angle $\beta$ between their respective input and output planes. Accordingly, the virtual refractive index $n_2$, as defined above in equation (3) is equal for both the first prism pair and the second prism pair.

The total optical path difference $w_d$ between identical wave fronts 20, 21 of the first and second optical beams 40, 41 after the phase shift device can be calculated from equation (4). Defining $d_1 = d_{2,1} - d_{1,1}$ and $d_2 = d_{2,2} - d_{1,2}$, in which $d_{1,1} = d_{1,1}' + d_{1,1}''$ and $d_{2,1} = d_{2,1}' + d_{2,1}''$, the optical path difference $w_d$ amounts to:

$$w_d = w_0 + (n_1-1)d_1 + (n_2-1)d_2 \tag{6}$$

in which $w_0$ equals the optical path difference between identical wave fronts 18, 19 of the first and second optical beam 40, 41 in front of the first and third prisms 2, 3.

The corresponding phase difference $\psi_d$ amounts to:

$$\psi_d = 2\pi\frac{w_d}{\lambda} \tag{7}$$

$\lambda$ being the wavelength of the first and second optical beams.

The refractive indices $n_1$, $n_2$ can be represented as second order expansions as function of the wavelength $\lambda$ of the form:

$$n_i = n_{0i} + a_i(\lambda - \lambda_0) + b_i(\lambda - \lambda_0)^2 + R_i(\lambda - \lambda_0), \tag{8}$$

in which $\lambda_0$ is the central wavelength of the spectral band considered, $n_{0i}$ is a wavelength independent term, $a_i$ the first order term coefficient, $b_i$ the second order term coefficient and $R_i$ the residual order term coefficient. The expression for $\psi_d$ thus becomes:

$$\psi_d/2\pi = \{w_0 + d_1(n_{01}-1) + d_2(n_{02}-1)\}\frac{1}{\lambda} + (d_1 a_1 + d_2 a_2)\frac{\lambda - \lambda_0}{\lambda} + \\ (d_1 b_1 + d_2 b_2)\frac{(\lambda - \lambda_0)^2}{\lambda} + \{d_1 R_1(\lambda - \lambda_0) + d_2 R_2(\lambda - \lambda_0)\}\frac{1}{\lambda}. \tag{9}$$

The wavelength dependent terms with $1/\lambda$ and $(\lambda-\lambda_0)^2/\lambda$ are eliminated by requiring:

$$w_0 + d_1(n_{01}-1) + d_2(n_{02}-1) - (d_1 a_1 + d_2 a_2)\lambda_0 = 0 \tag{10}$$

and:

$$d_1 b_1 + d_2 b_2 = 0. \tag{11}$$

The phase difference that now results (wavelength independent up to second order) is given by:

$$\psi_d = \psi_0 + \Delta\psi \quad (12)$$

with:

$$\psi_0/2\pi = d_1 a_1 + d_2 a_2 \quad (13)$$

and:

$$\Delta\psi/2\pi = \frac{d_1 R_1(\lambda - \lambda_0) + d_2 R_2(\lambda - \lambda_0)}{\lambda}. \quad (14)$$

From (11) and (13) $d_1$ and $d_2$ are found:

$$d_1 = \frac{-\psi_0 b_2}{a_2 b_1 - a_1 b_2} \frac{1}{2\pi} \quad (15)$$

$$d_2 = \frac{\psi_0 b_1}{a_2 b_1 - a_1 b_2} \frac{1}{2\pi}.$$

The final expression for $w_0$ follows from (10) and (15):

$$w_0 = \frac{\psi_0}{2\pi}\left\{\lambda_0 + \frac{b_2(n_{01} - 1) - b_1(n_{02} - 1)}{a_2 b_1 - a_1 b_2}\right\}. \quad (16)$$

It still remains to be investigated how the wavelength dependent residual error $\Delta\psi$, for possible materials and different spectral bandwidths, compares with the requirement. However, the described approach can be readily extended to correction of third or even higher order terms. This improved correction requires an additional plate of a different material for each following order to be compensated.

For the virtual refractive index $n_2$, as defined in equation (3) above, the coefficients $a_2$ and $b_2$ can be written according to $$a_2 = \left(\frac{dn_2}{d\lambda}\right)_{\lambda=\lambda_0} = a_1 \sin^2\beta\left(1 - \frac{n_{01}\cos\beta}{\sqrt{1 - n_{01}^2 \sin^2\beta}}\right) \quad (17)$$

and $$b_2 = \left(\frac{d^2 n_2}{d\lambda^2}\right)_{\lambda=\lambda_0} = 1/2 a_1^2 \frac{\sin^2\beta \cos\beta}{(1 - n_{01}^2 \sin^2\beta)^{\frac{3}{2}}} + \frac{b_1}{a_1} a_2. \quad (18)$$

Introducing the parameters $\gamma_1$ and $\gamma_2$, according to:

$$\gamma_1 = \frac{-b_2}{a_2 b_1 - a_1 b_2}, \quad (19)$$

$$\gamma_2 = \frac{b_1}{a_2 b_1 - a_1 b_2}$$

equation (15) can be reformulated as $$d_1 = \gamma_1 \frac{\psi_0}{2\pi} \quad (20)$$

$$d_2 = \gamma_2 \frac{\psi_0}{2\pi}.$$

This implies that by simultaneous adaptation of $d_1$ and $d_2$, such that $d_1/\gamma_1 = d_2/\gamma_2$, the phase shift $\psi_0$ can be adjusted while maintaining the chromatic correction. Such an adaptation can easily be achieved with the prism pair arrangement of FIG. 2 by a linear displacement of one of the prisms 2, 3, 4, 5 in the appropriate direction.

With the prism pair arrangement of FIG. 2, it is therefore possible to obtain a wavelength independent phase shift $\psi_0$ between the first and second optical beams, by shifting the first and second prism 2, 4 with respect to each other. It will be apparent that the phase shift can also be obtained by shifting the third and fourth prism 3, 5 with respect to each other.

The wavelength independent phase shift can be obtained by using the same optical material for all prisms 2, 3, 4, 5 in the arrangement according to FIG. 2, which is advantageous in view of producing the achromatic phase shift device 1, but also in operation, as environmental influences (e.g. temperature) will have the same influence on all prisms 2, 3, 4, 5.

FIG. 3 shows an embodiment of the achromatic phase modulator. For this example, circular optical beams of 20 mm diameter, a central wavelength $\lambda_0$ of 15 $\mu$m and potassium bromide (KBr) as prism material are assumed. The dimensions of the first through fourth prisms 2, 3, 4, 5 are identical, the first prism input planes 6, 7 and the second prism output planes 12, 13 having a dimension of 30 mm, the angle $\beta$ between the respective input and output planes being 35°. The distance between the first prism output plane 8 and second prism input plane is 5 mm. The second prism 4 can be moved with respect to the first prism 2 parallel to the second prism input plane 10 and perpendicular to the second prism output plane 12.

From the characteristics of potassium bromide and the formula (8) above, the following parameters are deduced:

$n_{01}=1.51276$; $a_1=-3.46$ mm$^{-1}$; and $b_1=-134.4$ mm$^{-2}$.

For the effective characteristics of the gap, the following parameters are found:

$n_{02}=0.976$; $a_2=1.70$ mm$^{-1}$; $b_2=52.9$ mm$^{-2}$.

The proportionality constants computed from equation (19) above then amount to $\gamma_1=1.164$ mm and $\gamma_2=2.958$ mm.

The excursion shown in FIG. 3 with a solid line complies with the values of $\gamma_1$ and $\gamma_2$ and corresponds to a phase shift of $-\pi < \psi_0 < \pi$, obtained by simultaneously moving the second prism 4 in a plane perpendicular to the intersection line of the second prism input plane 10 and the second prism output plane 12. The required accompanying optical path length variation $w_0$ according to equation (16) amounts to ±0.15 mm.

As described above, correction of third or even higher order terms can be implemented using an additional plan parallel plate 35, 36 with a refractive index different from the first and second prisms 2, 3, 4, 5, for each following order to be compensated. The plan parallel plates 35, 36 are positioned in front of the first prism 2, 3, but to the person skilled in the art, it will be clear that the plan parallel plates can also be positioned after the second prism 4, 5. Also, path length variation can be introduced by rotating the plan parallel plates 35, 36 such that the optical beams 40, 41 impinge on the plan parallel plates 35, 36 at a predetermined angle.

The achromatic phase shift device 1 described above can be modelled in a more general manner. FIG. 4 shows a general lay-out of a phase shift device 1 for introducing a phase shift in an optical beam 40 travelling from an input surface 51 to an output surface 52 of the phase shift device 1 during operation. The phase shift device 1 comprises a central element $2_0$ with a refractive index $n_0$. In FIG. 3, an (arbitrarily chosen) optical axis of the phase shift device 1 is designated by reference numeral 50. The phase shift device 1 further comprises M pairs of refractive elements with a refractive index $n_k$, each pair of refractive elements comprising a first element $2_k$ and a second element $4_k$ being positioned symmetrically on each side of the central element $2_0$ along the optical axis 50. All elements are provided with an input plane for receiving the optical beam 40 and an output plane from which the optical beam 40 exits. An output plane of one element is positioned flush with an input plane from an adjacent element, thus providing an interface from a material with refractive index $n_k$ to a material with refractive index $n_{k+1}$. The input plane of the first element $2_k$ and the output plane of the second element $4_k$ of a pair are parallel to each other. Also, the output plane of the first element $2_k$ and the input plane of the second element $4_k$ of a pair are parallel to each other. This arrangement guarantees that the optical beam 40 travelling through the phase shift device is at the same angle $\theta_k$ with the optical axis 50 in both the first element $2_k$ and the second element $4_k$ of each pair.

The pairs of elements $2_k$, $4_k$ are characterised by their refractive index $n_k$, the angle $\beta_k$ and the distance along the optical axis 50, denoted by $d_k'$ for each first element $2_k$ and $d_k''$ for each second element $4_k$. Furthermore, $\beta_k$ denotes the angle between a surface perpendicular to the optical axis 50 and the input plane of the first element $2_k$ (or, equivalently, the angle between a surface perpendicular to the optical axis 50 and the output plane of the second element $4_k$).

It is noted that the angle $\beta$, described above with respect to FIG. 2 would be equal to $\beta_k - \beta_{k-1}$ as described here with respect to FIG. 3.

It can be deduced from the refraction law of Snellius and trigonometry that the optical path length $w_p$ through the phase shift device 1 is given by $$w_p = \sum_{k=0}^{M-1} a_k d_k, \quad (21)$$

with $d_k = d_k' + d_k''$ being the distance along the optical axis 50 through elements $2_k$ and $4_k$ and $a_k = n_k \cos \theta_k$ being a modified refractive index dependent on the angle $\theta_k$ of the optical beam 40 in elements $2_k$ and $4_k$.

In a practical embodiment of the phase shift device 1 according to FIG. 4, the central element $2_0$ and the pairs of elements with an even index ($2_2$, $4_2$, $2_4$, $4_4$, ...) have the same refractive index n, and may be formed by the environment of the phase shift device 1, e.g. vacuum, air or liquid. This allows an easier production of the phase shift device 1, and prevents problems concerning the joining of the output and input surfaces of adjacent elements $2_k$, $2_{k+1}$ and $4_k$, $4_{k+1}$.

In a further embodiment, the refractive indices $n_k$ of the first and second elements with an odd index ($2_1$, $4_1$, $2_3$, $4_3$, ...) are chosen the same, i.e. only one material is used for producing all elements of the phase shift device. This has the advantage of lower cost of manufacture, as only one material is used for all elements $2_k$, $4_k$. Also, environmental conditions will be of less influence when all elements $2_k$, $4_k$ are of the same material compared to elements $2_k$, $4_k$ of various materials.

FIG. 5 shows a simplified representation of a two beam system with an achromatic phase shift device 1 as described with reference to FIG. 4. The pairs of elements $2_k$, $4_k$ are represented by element blocks $55_k$ for a first beam 40 and element blocks $56_k$ for a second beam 41. Each element block $55_k$, $56_k$ is characterised by its modified refractive index $a_k$ and the distance $d_{i,k}$ along the optical axis 50 as defined above with reference to FIG. 4. In this embodiment, the refractive indices of corresponding elements in the phase shift device 1 in the path of the first optical beam 40 and the phase shift device in the path of the second optical beam 41 are chosen equal. The optical path length difference $w_0$ between identical wave fronts 18, 19 (as indicated with reference to FIG. 2) is depicted in FIG. 5 as an optical path length $w_0$ in series with the phase shift device in the second optical beam 41.

In a two beam system, one phase shift device 1 may be positioned in the path of one of the first and second beams 40, 41. In that case, an optical path length difference $w_d$ is introduced which is equal to $$w_d = -w_0 + \sum_{k=0}^{M-1} a_k d_k. \quad (22)$$

It is also possible to provide a phase shift device 1 in each of the optical paths of the first and second beams 40, 41 as indicated in FIG. 5. In this case, the optical path difference $w_d$ introduced between the first and second optical beams 40, 41 is equal to $$w_d = -w_0 + \sum_{k=0}^{M-1} a_k (d_{1,k} - d_{2,k}). \quad (23)$$

In general terms, the essential property of the achromatic phase shifter according to the present invention can be summarised as the wavelength difference according to $$w_d(\lambda) = \frac{\psi_0}{2\pi}\lambda + \Delta w_d(\lambda), \quad (24)$$

where $\psi_0$ is the desired achromatic phase shift and $\Delta w_d$ is the wavelength dependent part. The term $\Delta w_d(\lambda)$ should be minimised over the wavelength range of interest and ideally $\Delta w_d(\lambda)$ would be equal to zero.

The dimensions of the refractive elements can be chosen in a number of manners. The first is to obtain a perfect match for M+1 wavelengths $\lambda_0 \ldots \lambda_M$. This can be obtained by solving the following M+1 equations for $d_0 \ldots d_{M-1}$ and $w_0$:

$$-w_0 + a_0(\lambda_0)d_0 + \ldots + a_{M-1}(\lambda_0)d_{M-1} = \frac{\psi_0}{2\pi}\lambda_0 \quad (25)$$
$$\vdots \qquad \vdots \qquad \vdots$$
$$-w_0 + a_0(\lambda_M)d_0 + \ldots + a_{M-1}(\lambda_M)d_{M-1} = \frac{\psi_0}{2\pi}\lambda_M.$$

Alternatively, it is an option to obtain an M-th order fit for the central wavelength $\lambda_0$. This can be obtained by writing the wavelength difference $w_d$ in a series expansion according to $$w(\lambda) = -w_0 + \sum_{k=0}^{M-1} \{a_{k0} + a_{k1}(\lambda - \lambda_0) + a_{k2}(\lambda - \lambda_0)^2 \ldots \} d_k \quad (26)$$

and requiring the constant term and terms with $\lambda^2$, $\lambda^3$, ... $\lambda^M$ to become zero and require the term with $(\lambda - \lambda_0)$ to have the desired coefficient of $\psi_0/2\pi$. This will result in a set of M+1 equations in the unknowns $d_0 \ldots d_{M-1}$ and $w_0$. Solving the set of equations will provide the design parameters $d_0 \ldots d_{M-1}$ for the first and second elements $2_k$, $4_k$.

Note that in the embodiment described above with reference to FIG. 2, a second order fit is determined around the central wavelength $\lambda_0$.

For interferometry as applied in optical synthetic aperture systems, phase shifting of the interfering beams is an essential feature. In the following, the situation will be described of interfering broadband optical beams coming from a single telescope pair. It will be apparent to the person skilled in the art, that the principles can also be applied to multiple beam interference systems with more than two beams.

FIG. 6 shows a situation where pupil plane interference is applied in a two-beam interferometer. First and second optical beams 22, 23, being images from the same region of interest, are received from a first telescope and a second telescope (not shown), respectively on a first interferometer input plane 24 and a second interferometer input plane 25. The two beams eventually are combined in a combiner element 32 and interfere in an interference or focal plane 33. Using first and second optical delay lines 26, 27, the optical path lengths from interferometer input plane 24, 25 to focal plane 33 are equalised for both arms. This will result in a flat, white light illumination of the focal plane 33 at maximum intensity. Phase modulation is applied to the first and second optical beam by first and second phase shift devices 28, 29, resulting in an intensity variation, the amplitude of which can be measured. The measured amplitude represents the magnitude of the component of the spatial Fourier spectrum that corresponds to the measurement baseline, i.e. the distance between the first and second telescope. When this phase modulation is performed in a conventional way, e.g. by path length variation, the measured amplitude decreases with increasing path length and spectral bandwidth, because wavelength dependent phase differences are introduced. Use of an achromatic phase shifter according to the present invention avoids this source of inaccuracy and loss of sensitivity.

When using the interferometer for planet detection, a fixed phase shift of $\pi$ radians is needed between the two beams to block light of the associated adjacent star (nulling) in order to permit observation of the much weaker planet signal.

However, further embodiments of interferometers are being developed, in which multiple telescopes are used in a predetermined configuration of baselines, the telescopes being aimed at the same region of interest. Depending on the specific embodiment of the multiple beam interferometer, different predetermined phase shifts need to be introduced between the various beams to obtain nulling. The achromatic phase shift device 1 according to the invention is well suited for application in such interferometers.

In the case of optical beams from a telescope, a wide spectral band is mandatory for reasons of signal-to-noise ratio, and for permitting spectral characterisation of the planet signal. Also, a high suppression factor of the star light of at least $10^6$ is needed. This requirement is equivalent to a maximum residual phase shift of the first optical beam with respect to the second optical beam of ±2 mrad over the wavelength band of interest.

Theoretical evaluations of the interferometer according to the present invention have shown that a suppression factor of $10^9$ may be obtainable.

For the person skilled in the art, it will be clear that modifications and variations of the achromatic phase shift device and interferometer according to the present invention are perceivable. The particular embodiments described above with reference to the accompanying drawings are illustrative only and not meant to limit the scope of the invention, which is defined by the appended claims.

What is claimed is:

1. Achromatic phase shift device for introducing a wavelength independent optical phase shift in a first optical beam during operation, comprising at least one dispersive element, the at least one dispersive element comprising k element pairs ($55_k$), k being an integer between 1 and M, each element pair being formed by respective first refractive means ($2_k$) and second refractive means ($4_k$), the respective first refractive means ($2_k$) having a first refractive means input plane (6) for receiving a first optical beam (40) and a first refractive means output plane (8), the first refractive means input plane (6) and the first refractive means output plane (8) being at a predetermined angle $\beta_k$ to each other, $0<\beta_k<\pi/2$, the respective second refractive means ($4_k$) having a second refractive means input plane (10) and a second refractive means output plane (12), said second refractive means input plane (10) being positioned equidistant to the first refractive means output plane (8) and the second refractive means output plane (12) being positioned parallel to the first refractive means input plane (6), characterised in that the device (1) introduces a predetermined phase shift $\psi_0$ between the first optical beam (40) and a second optical beam (41), the second optical beam (41) running substantially parallel to the first optical beam (40) over an optical path length $w_0$, a first optical axis (50) being defined from a device input surface (51) to a device output surface (52), the first refractive means ($2_k$) having a first distance $d_k'$ along the first optical axis (50) and the second refractive means having a second distance $d_k''$ along the first optical axis (50), the first optical beam (40) being at an angle $\theta_k$ with the first optical axis (50) and a modified refractive index $a_k$ being defined as $a_k = n_k \cos \theta_k$, in which the sum $d_k$ of the first and second distance of the first and second refractive means ($2_k$, $4_k$), respectively and the required optical path $w_0$ are determined by solving the following equations for the wavelengths ($\lambda_0 \ldots \lambda_M$) at which the predetermined phase shift $\psi_0$ should be obtained exactly:

$$-w_0 + a_0(\lambda_0)d_0 + \ldots + a_{M-1}(\lambda_0)d_{M-1} = \frac{\psi_0}{2\pi}\lambda_0$$
$$\vdots \qquad \qquad \vdots \qquad \qquad \vdots$$
$$-w_0 + a_0(\lambda_M)d_0 + \ldots + a_{M-1}(\lambda_M)d_{M-1} = \frac{\psi_0}{2\pi}\lambda_M$$

2. Device according to claim 1, characterised in that the respective first refractive means ($2_k$) of the k element pairs ($55_k$) are positioned adjacent to each other, forming a first group, the respective first refractive means ($2_k$) in the first group being in physical contact.

3. Device according to claim 2, characterised in that the respective first and second refractive means ($2_k$, $4_k$) of the k element pairs ($55_k$) are positioned symmetrically on respective sides of a first element pair ($55_0$).

4. Device according to claim 1, characterised in that the respective second refractive means ($4_k$) of the k element pairs ($55_k$) are positioned adjacent to each other, forming a second group, the respective second refractive means ($4_k$) in the second group being in physical contact.

5. Device according to claim 1, characterised in that the refractive index ($n_k$) of the first refractive means ($2_k$) and the second refractive means (4$_k$) of a specific pair of the k element pairs (55$_k$) is substantially equal.

6. Device according to claim 1, characterised in that spaces between the first refractive means (2$_k$) and the second refractive means (4$_k$) of each of the k element pairs (55$_k$) are filled with a predetermined medium having a predetermined refractive index (n$_0$).

7. Device according to claim 1, characterised in that the device further comprises first control means for moving the first refractive means (2$_k$) and the second refractive means (4$_k$) of at least one of the k element pairs (55$_k$) with respect to each other, the direction of movement being perpendicular to a line of intersection of the input surface and output surface of the first refractive means (2$_k$).

8. Device according to claim 1, characterised in that the first and second refractive means (2$_k$, 4$_k$) are formed by a first and a second prism (2, 4; 3, 5), respectively.

9. Device according to claim 1, characterised in that the device (1) further comprises additional means (35, 36) of a dispersive material for applying a chromatic correction to the optical beam, in which the dispersive material has a refractive index which is different from the refractive index (n$_k$) of the first and second refractive means (2$_k$, 4$_k$) of a first pair (55$_0$) and plurality of further pairs (55$_k$).

10. Interferometer having a first input plane and a second input plane for receiving at least a first and a second optical beam and an interference plane for letting the at least first and second optical beam interfere, a first optical path being formed from the first input plane to the interference plane and a second optical path being formed from the second input plane to the interference plane, comprising optical path delay means for introducing an optical path difference between the first optical path and the second optical path, characterized in that the interferometer further comprises at least one achromatic phase shift device according to claim 1, positioned in at least one of the first optical path and the second optical path.

11. Interferometer according to claim 10, characterised in that an achromatic phase shift device is positioned in each optical path.

12. Interferometer according to claim 10, characterised in that the interferometer comprises main control means for maintaining the phase shift ($\Psi_0$) between the at least first and second beam at a predetermined value, the main control means being connected to the optical path delay means (26, 27), and the first control means.

13. Interferometer according to claim 12, characterised in that the predetermined value is equal to $\pi$.

14. Achromatic phase shift device for introducing a wavelength independent optical phase shift in a first optical beam during operation, comprising at least one dispersive element, the at least one dispersive element comprising k element pairs (55$_k$), k being an integer between 1 and M, each element pair being formed by respective first refractive means (2$_k$) and second refractive means (4$_k$), the first refractive means (2$_k$) having a first refractive means input plane (6) for receiving a first optical beam (40) and a first refractive means output plane (8), the first refractive means input plane (6) and the first refractive means output plane (8) being at a predetermined angle $\beta_k$ to each other, $0<\beta_k<\pi/2$, the second refractive means (4$_k$) having a second refractive means input plane (10) and a second refractive means output plane (12), said second refractive means input plane (10) being positioned equidistant to the first refractive means output plane (8) and the second refractive means output plane (12) being positioned parallel to the first refractive means input plane (6), characterised in that the device introduces a predetermined phase shift $\psi_0$ between the first optical beam (40) and a second optical beam (41), the second optical beam (41) running substantially parallel to the first optical beam (40) over an optical path length $w_0$, a first optical axis (50) being defined from a device input surface (51) to a device output surface (52), the first refractive means (2$_k$) having a first distance $d_k'$ along the first optical axis (50) and the second refractive means having a second distance $d_k''$ along the first optical axis (50), the first optical beam (40) being at an angle $\theta_k$ with the first optical axis (50) and a modified refractive index $a_k$ being defined as $a_k = n_k \cos \theta_k$, in which the sum $d_k$ of the first and second distance of the first and second refractive means (2$_k$, 4$_k$), respectively, and the required optical path $w_0$ are determined by requiring constant terms and terms with $\lambda^2, \lambda^3, \ldots, \lambda^M$ to become zero and the term with $\lambda$ to become equal to $\psi_0/2\pi$ in the equation for the introduced optical path length difference $w_d(\lambda)$ according to $$w_d(\lambda) = -w_0 + \sum_{k=0}^{M-1} \{a_{k0} + a_{k1}(\lambda - \lambda_0) + a_{k2}(\lambda - \lambda_0)^2 \ldots \} d_k$$

in which $a_{k0}, a_{k2}, \ldots$ = series expansion coefficients of the modified refractive index $a_k$, according to $$a_k = a_{k0} + a_{k1}(\lambda - \lambda_0) + a_{k2}(\lambda - \lambda_0)^2 \ldots$$

in which $\lambda$ is a wavelength of the optical beam (40) and $\lambda_0$ is a central wavelength of a predetermined spectral band.

* * * * *